G. McD. BRIGHT.
BEVERAGE DISPENSER.
APPLICATION FILED DEC. 2, 1921.

1,430,935.

Patented Oct. 3, 1922.
2 SHEETS—SHEET 1.

Inventor
George McD. Bright,
By
Attorney

G. McD. BRIGHT.
BEVERAGE DISPENSER.
APPLICATION FILED DEC. 2, 1921.
1,430,935.
Patented Oct. 3, 1922.
2 SHEETS—SHEET 2.
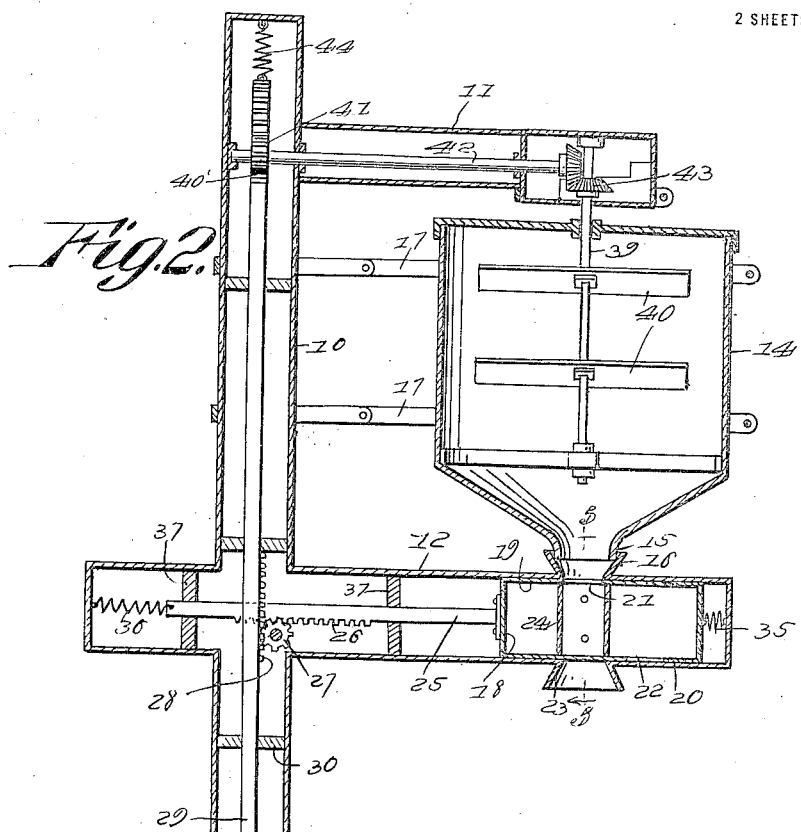
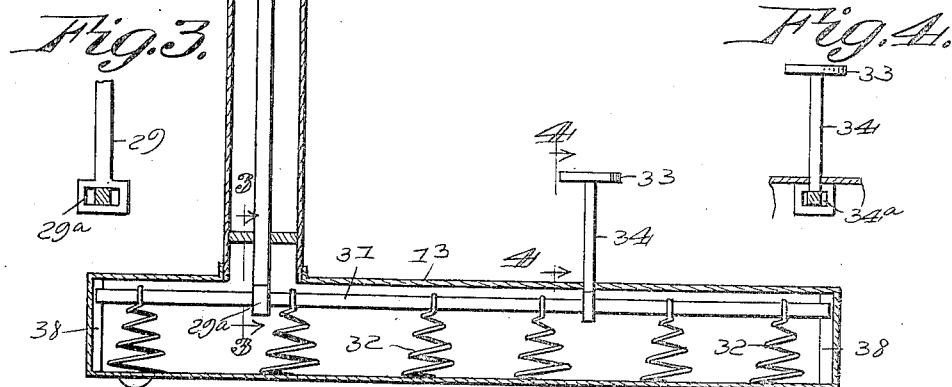
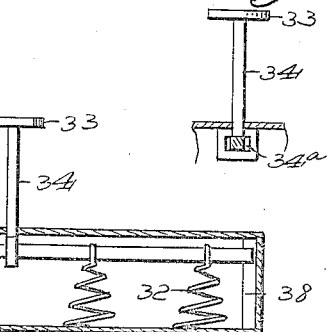
Inventor
George McD. Bright,
By
Attorney Patented Oct. 3, 1922.

1,430,935

UNITED STATES PATENT OFFICE.

GEORGE McD. BRIGHT, OF BEGGS, OKLAHOMA.

BEVERAGE DISPENSER.

Application filed December 2, 1921. Serial No. 519,473.

*To all whom it may concern:*

Be it known that I, GEORGE McD. BRIGHT, a citizen of the United States of America, residing at Beggs, in the county of Okmulgee and State of Oklahoma, have invented new and useful Improvements in Beverage Dispensers, of which the following is a specification.

The object of the invention is to provide a simple and efficient means for readily and conveniently dispensing beverages in definite quantities without relying upon the observation of the operator or the manipulation of valves ; and with this object in view the invention consists in a construction and combination of parts of which a preferred embodiment is shown in the accompanying drawings, wherein :—

Figure 2 is a sectional view taken vertically of the same.

Figure 1:
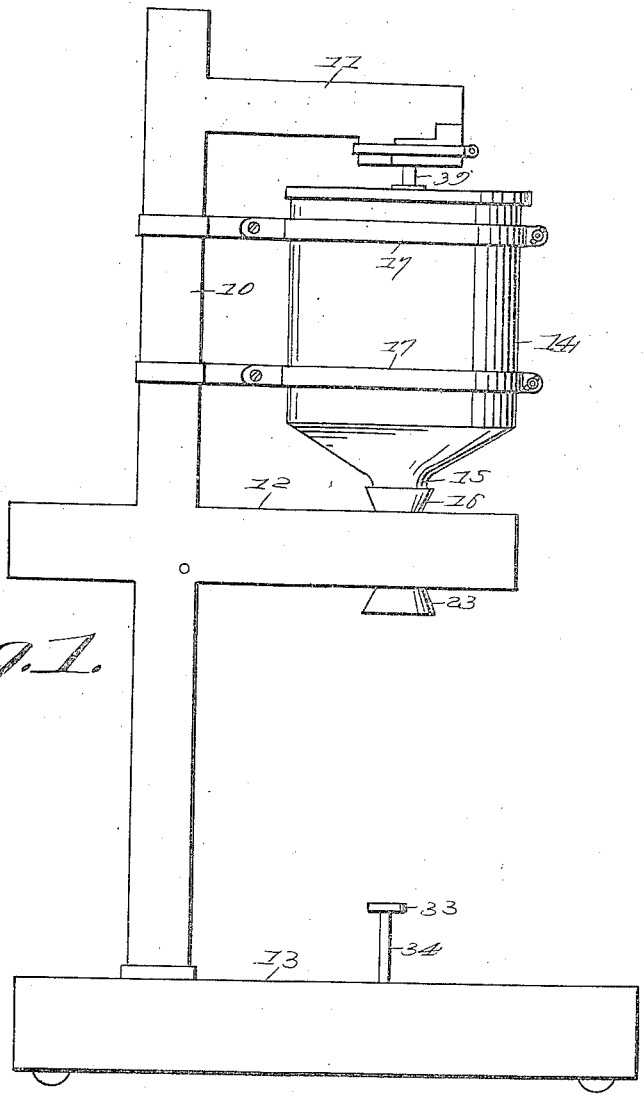
Figure 1 is a side view of an apparatus embodying the invention.
Figure 5:
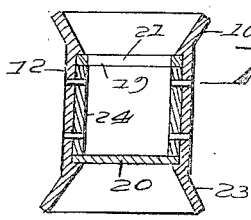

Figures 3, 4 and 5 are detail sectional views on the planes indicated respectively by the lines 3—3, 4—4 and 5—5.

Supported by a receptacle framework having a standard 10 and forwardly directed upper and lower arms 11 and 12, and provided with a suitable base 13, is a receptacle 14 in the form of a canister disposed in an inverted position with its neck 15 fitted in a suitable funnel 16, said receptable being supported from the standard 10 by means of clamps 17 to permit of the removal thereof with facility for replacement or the replenishment of the contents thereof.

The lower arm 12 of the framework is hollow as indicated to receive and constitute a guide for a slide valve 18 having upper and lower wings 19 and 20 in which are respectively formed openings 21 and 22 for respective but alternative registration with the funnel 16 and an outlet spount 23 carried respectively by the upper and lower sides of the arm 12, a tube 24 being arranged in the guide and between the wings of the slide valve to convey material from the funnel to the spout.

The valve is provided with a stem 25 having a rack 26 with which meshes a pinion 27, and also meshing with said pinion or an equivalent thereof adapted to effect movement of the rack 26 is a rack 28 carried by a plunger bar 29 fitted in suitable guides 30 in the standard 10 and attached at its lower end to a plunger 31 which is supported by springs 32 and supports a tumbler rest 33, said plunger being housed within the base 13 which is hollow and constitutes a suitable casing for the same. The springs 32 as shown in the drawing are of the volute form commonly used for cushioning purposes and the disk constituting the tumbler rest is connected with the plunger 31 by means of a suitable stem 34 so that when a tumbler or similar receptacle is placed upon the rest and pressed downward to the limit of free movement, the plunger is correspondingly actuated and communicates motion to the plunger bar 29 which in turn actuates the pinion 28 to move the valve 18 from the normal position indicated in full lines in Figure 2 to the dotted line position to permit of the discharge from the tube 24 of the material which has been fed into said tube from the receptacle 14 through the opening 16 of the valve. The movement of the valve to the discharge position by the depression of the plunger obviously cuts off communication with the receptacle 14, so that only that amount of material which has been deposited in the tube 24 is discharged through the spout 23 into the tumbler or other receptacle by which the operation of the mechanism has been effected.

The expansion of the springs 32 upon the release of downward pressure upon the tumbler rests, or the removal of the tumbler therefrom, causes the return of the valve to the normal position indicated in full lines in Figure 2 with the spout or outlet closed and with communication established between the receptacle 14 and the stationary tube 24. Also arranged in the path of movement of the plunger is a cushioning spring 35 while connected with the end of the stem 25 is a tensile spring 36, serving together with suitable guides 37 in the arm 12 to properly direct the movement of the valve. The plunger 31 preferably consists of a bar as indicated with its extremities fittted in vertical guides 38 on the end walls of the base, and the lower ends of the plunger bar 29 and stem 34 are provided with transversely elongated openings 29ª and 34ª for the reception of said bar to avoid any cramping or locking of the parts in operation.

In order that the material of powdered or granulated form which is adapted to be dispensed from the receptacle 14 may be induced to flow with regularity to supply the tube 24, it is preferable to employ a feeding means such as an agitator consisting of a rotary spindle 39 carrying blades 40 disposed to act as steering and feeding agencies and actuable from the plunger 31 at each operation thereof by providing the plunger bar 29 with a rack 40 meshing with a pinion 41 on a shaft 42 connected by bevel gearing 43 with said spindle 39. Also a spring 44 for assisting in bearing the weight of the plunger bar may be connected with the upper end of the latter.

It will be noted that at each depression of the plunger due to the placing of a glass or like receptacle on the rest 33 and bearing downward thereon to the limit of movement and then raising and removing the glass, the position of the valve 18 will be reversed and returned to discharge a fixed quantity of material into the glass, and that simultaneously the agitator will be operated to prepare the material in the receptacle 14 to feed readily into the tube or measuring unit 24 when the valve resumes its original or normal position with the port 16 in registration with the funnel.

It will further be observed that the contents of the receptacle 14 and also the various operating elements of the structure and mechanism are housed and fully protected from dust and from contact with adjacent objects, and the device including the supporting frame may be made of an ornamental and attractive form suitable for display at soda fountains and like stations for the dispensing of beverages.

Having described the invention, what is claimed as new and useful is:—

1. A beverage dispensing apparatus having a hollow supporting frame consisting of a standard, a base, and forwardly directed upper and lower arms carried by the standard, a receptacle supported between said arms and having a downwardly discharging outlet, valve mechanism mounted in and housed by the lower arm for controlling the discharge from said receptacle, agitator mechanism arranged in the receptacle, a plunger mounted in and housed by the base and carrying a tumbler rest located beneath the outlet from said receptacle, a plunger bar mounted in and housed by said standard and operatively connected at its lower end with said plunger, and operating connections between said plunger bar and said valve and agitator mounted in and housed respectively by said lower and upper arms.

2. A beverage dispensing apparatus having a hollow supporting frame consisting of a standard, a base, and forwardly directed upper and lower arms carried by the standard, a receptacle supported between said arms and having a downwardly discharging outlet, valve mechanism mounted in and housed by the lower arm for controlling the discharge from said receptacle, agitator mechanism arranged in the receptacle, a plunger mounted in and housed by the base and carrying a tumbler rest located beneath the outlet from said receptacle, a plunger bar mounted in and housed by said standard and operatively connected at its lower end with said plunger, and operating connections between said plunger bar and said valve and agitator mounted in and housed respectively by said lower and upper arms, the plunger bar being spring supported and having a limited range of movement.

3. A beverage dispensing apparatus having a hollow supporting frame consisting of a standard, a base, and forwardly directed upper and lower arms carried by the standard, a receptacle supported between said arms and having a downwardly discharging outlet, valve mechanism mounted in and housed by the lower arm for controlling the discharge from said receptacle, agitator mechanism arranged in the receptacle, a plunger mounted in and housed by the base and carrying a tumbler rest located beneath the outlet from said receptacle, a plunger bar mounted in and housed by said standard and operatively connected at its lower end with said plunger, and operating connections between said plunger bar and said valve and agitator mounted in and housed respectively by said lower and upper arms, said agitator being of the rotary type with a spindle extending into the upper arm of the frame, and the operating connections thereupon consisting of a shaft geared to said spindle and having a pinion meshing with a rack on said plunger bar.

4. A beverage dispensing apparatus having a hollow supporting frame consisting of a standard, a base, and forwardly directed upper and lower arms carried by the standard, a receptacle supported between said arms and having a downwardly discharging outlet, valve mechanism mounted in and housed by the lower arm for controlling the discharge from said receptacle, agitator mechanism arranged in the receptacle, a plunger mounted in and housed by the base and carrying a tumbler rest located beneath the outlet from said receptacle, a plunger bar mounted in and housed by said standard and operatively connected at its lower end with said plunger, and operating connections between said plunger bar and said valve and agitator mounted in and housed respectively by said lower and upper arms, the lower arm having upper and lower registering ports, a measuring tube registering with and arranged between said ports, and the valve having upper and lower leaves extending between the extremities of said measuring tube and said ports and being provided with ports for alternate registration with the tube.

In testimony whereof he affixes his signature.

GEORGE McD. BRIGHT.